United States Patent
Garg et al.

(10) Patent No.: US 6,789,114 B1
(45) Date of Patent: Sep. 7, 2004

(54) METHODS AND APPARATUS FOR MANAGING MIDDLEWARE SERVICE IN A DISTRIBUTED SYSTEM

(75) Inventors: Sachin Garg, Bridgewater, NJ (US); Yennun Huang, Bridgewater, NJ (US); Jürgen Schönwälder, Niedersachsen (DE); Adrianus Petrus Antonius van Moorsel, Bedminster, NJ (US); Shalini Yajnik, Scotch Plains, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 964 days.

(21) Appl. No.: 09/129,338

(22) Filed: Aug. 5, 1998

(51) Int. Cl.$^7$ ............................ G06F 15/16; G06F 11/30

(52) U.S. Cl. ........................ 709/224; 718/105; 719/328; 714/47; 714/712

(58) Field of Search .............................. 709/223, 224, 709/222, 225, 229; 718/105; 719/328; 714/47, 712

(56) References Cited

U.S. PATENT DOCUMENTS

| | | | | |
|---|---|---|---|---|
| 5,586,251 A | * | 12/1996 | Coleman et al. | 395/183.19 |
| 5,740,357 A | * | 4/1998 | Gardiner et al. | 395/185.1 |
| 5,978,933 A | * | 11/1999 | Wyld et al. | 714/13 |
| 6,035,415 A | * | 3/2000 | Fleming | 714/11 |
| 6,052,733 A | * | 4/2000 | Mahalingam et al. | 709/235 |
| 6,061,722 A | * | 5/2000 | Lipa et al. | 709/224 |
| 6,065,053 A | * | 5/2000 | Nouri et al. | 709/224 |

OTHER PUBLICATIONS

John A. Zinky, David E. Bakken and Richard D. Schantz, *Architectural Support for Quality of Service for CORBA Objects*, Theory and Practice of Object Systems, vol. 3(1), (1997).

Orbix Manager User's Guide, Iona Technologies PLC, (Jan. 1998).

* cited by examiner

Primary Examiner—Dung C. Dinh (57) ABSTRACT

A distributed computing system includes a number of computers, workstations or other computing machines interconnected by a network. One or more service managers are introduced that provide a management interface to corresponding middleware services. The service manager monitors the corresponding middleware service, as well as the underlying distributed computer environment on which an application process that utilizes the middleware service is executing, and allows the middleware service to operate more efficiently, in response to run-time environmental conditions. A fault-tolerance service manager is provided as a management interface to a fault-tolerance service. The fault-tolerance service manager monitors the fault-tolerance service, as well as the underlying distributed computer environment, to make globally optimal decisions, based on run-time environmental data, and to provide the resulting information to the fault-tolerance service. The fault-tolerance service manager can notify the fault-tolerance service about hazardous network conditions (such as object hosts that may crash soon) and the fault-tolerance service may decide to migrate application objects or take other corrective action. The collected environmental data can be used to determine a health rating of components within the computing environment which can be utilized, for example, to select an optimal machine for migration, or to trigger migration or additional replication in the event the health rating indicates that a failure is expected.

25 Claims, 5 Drawing Sheets

METHODS AND APPARATUS FOR MANAGING MIDDLEWARE SERVICE IN A DISTRIBUTED SYSTEM

FIELD OF THE INVENTION

The present invention relates generally to distributed computing systems, and more particularly, to management techniques for services, such as fault tolerance and fault recovery services, that may be utilized by an application process executing in a distributed system.

BACKGROUND OF THE INVENTION

Increasingly, software applications must be resistant, or at least tolerant, to software faults. Users of telecommunication switching systems, for example, demand that the switching systems are continuously available. In addition, where transmissions involve financial transactions, such as for automated teller machines (ATMs), or other sensitive data, customers also demand the highest degree of data consistency.

While software testing and debugging tools provide an effective basis for detecting many programming errors during the software development stage which may lead to a fault in the user application process, no amount of verification, validation or testing during the software debugging process will detect and eliminate all software faults and give complete confidence in a user application program. Accordingly, residual faults due to untested boundary conditions, unanticipated exceptions and unexpected execution environments have been observed to escape the testing and debugging process and, when triggered during program execution, will manifest themselves and cause the application process to crash or hang, thereby causing service interruption.

It is therefore desirable to provide mechanisms that allow a user application process to recover from a fault with minimal amount of lost information. Thus, in order to minimize the amount of lost information, a number of checkpointing and restoration techniques have been proposed to recover more efficiently from hardware and software failures. For a general discussion of checkpointing and rollback recovery techniques, see R. Koo and S. Toueg, "Checkpointing and Rollback-Recovery for Distributed Systems," IEEE Trans. Software Eng., Vol. SE-13, No. 1, pp.23–31 (January 1987). Generally, checkpoint and restoration techniques periodically save the process state during normal execution, and thereafter restore the saved state following a failure. In this manner, the amount of lost work is minimized to progress made by the user application process since the restored checkpoint.

As applications have become more sophisticated and distributed, their design and implementation have become a complex task. In a distributed computing environment, processes from heavily loaded machines can be migrated to more lightly loaded machines in order to utilize the available computing resources more efficiently. In addition, the availability of alternative machines in a distributed computing environment allows a failed process to be migrated following a failure to a checkpointed state on an alternative processor.

To facilitate the development of distributed applications, many middleware techniques and platforms have been proposed, such as the increasingly popular Common Object Request Broker Architecture (CORBA). Although CORBA eases the development of distributed applications, CORBA does not currently address the reliability and availability requirements found in many applications, especially in the telecommunications world. In order to improve the reliability and availability of applications, some researchers have implemented Object Request Brokers (ORBs) based on the concept of group communication and virtual synchrony. For a more detailed discussion of ORB-based reliability and availability techniques, see, for example, S. Maffeis, "Piranha—A CORBA Tool For High Availability," IEEE Computer (April 1997), or S. Maffeis and D. C. Schmidt, "Constructing Reliable Distributed Communication Systems With CORBA," IEEE Communications Magazine, vol. 14, no. 2 (February 1997).

Another approach to providing fault-tolerance to CORBA applications is a service approach that extends the existing set of CORBA services with a fault tolerance service. The service approach defines a set of objects and object interfaces to provide fault tolerance, referred to as the Fault Tolerance Service (FTS). An FTS system is implemented as a collection of interacting CORBA objects, that detect CORBA object failures and host failures, and recover CORBA objects from such failures. An application developer may improve the reliability of an application using the FTS service to implement fault-tolerant CORBA objects.

Although the FTS service effectively detects CORBA object failures and host failures, and recovers CORBA objects from such failures, the FTS service, as well as other CORBA services, suffers from a number of limitations, which, if overcome, could greatly expand the utility and efficiency of such services. In particular, few, if any, existing CORBA services have exploited the advantages of responding to run-time environmental conditions.

SUMMARY OF THE INVENTION

Generally, one or more service managers are disclosed that provide a management interface to corresponding middleware services. According to an aspect of the invention, the service manager monitors the corresponding middleware service, as well as the underlying distributed computer environment on which an application process that utilizes the middleware service is executing. The data received from the middleware service permits the service manager to monitor the operation of the middleware service. In addition, the information received from the underlying distributed computer environment allows the middleware service to operate more efficiently, in response to run-time environmental conditions. The addition of separate management utilities to middleware services, improves the operation of the service and results in a three-step architecture: the base application process, a middleware service, and the service manager.

In one illustrative implementation, a fault-tolerance service manager provides a management interface to a fault-tolerance service (FTS). The fault-tolerance service permits an application developer to enhance the availability and reliability of an application built on top of the middleware platform. While the registration process for a conventional fault-tolerance service typically relies on static (usually hard-coded) information, the present invention allows the registration and replica management of application objects to be performed based on run-time environmental conditions.

Generally, the fault-tolerance service manager monitors the fault-tolerance service, as well as the underlying distributed computer environment. In this manner, the fault-tolerance service manager can make globally optimal decisions, based on received run-time data, and provide the resulting information (processed data or specific decisions) to the fault-tolerance service. The present invention allows the fault-tolerance service to tolerate failures using a failure-prevention approach, whereby the fault-tolerance service takes corrective action and migrates CORBA objects if the fault-tolerance service manager detects that an object's local host may crash soon. In one embodiment, the likelihood of a host failure is determined based on a health rating of the respective host or other system components.

The fault-tolerance service manager obtains data about the operation of the fault-tolerance service, such as the names, number and type of registered objects, and the location and status of various entities within the fault-tolerance service, such as watchdogs and the super watchdog. In addition, the fault-tolerance service manager collects additional information about the underlying computing platform, such as the status of the operating system resources, the instantaneous load, failure rate or performance of one or more machines, or the status of the communication links in the computing environment, processes the collected environmental information and provides feedback to the fault-tolerance service. The collected environmental data can be used to determine a health rating of components within the computing environment which can be utilized, for example, to select an optimal machine for migration, or to trigger migration or additional replication in the event the health rating indicates that a failure is expected.

In one preferred implementation, the fault-tolerance service manager does not change or perform any of the functions of the fault-tolerance service, nor does the fault-tolerance service manager assume any responsibility about decisions relate d to the fault-tolerance mechanisms. Thus, the fault-tolerance service performs its own intended functions even in the absence of the fault-tolerance service manager. Since the fault-tolerance service manager has minimal interference with the fault-tolerance service, the fault-tolerance service manager may use existing management technology, such as the Simple Network Management Protocol (SNMP).

DETAILED DESCRIPTION OF THE INVENTION

Figure 1:
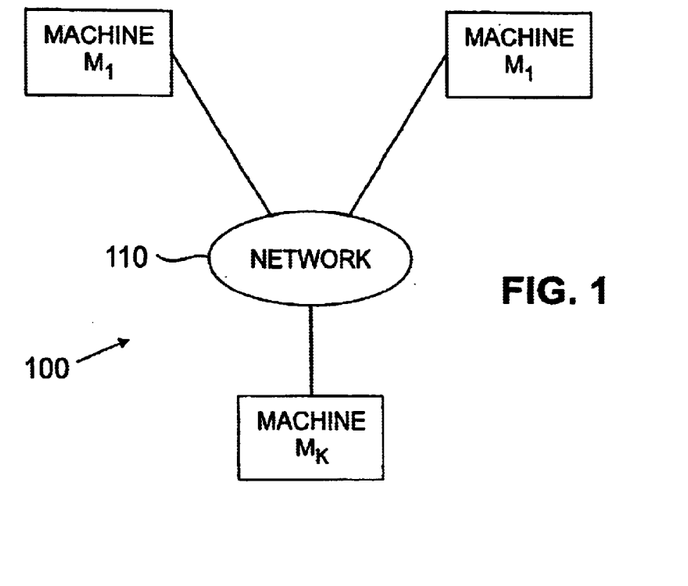
FIG. 1 is a block diagram illustrating an exemplary distributed computing system in which the invention may be implemented.

FIG. 1 shows an exemplary distributed computing environment 100 in which the invention may be implemented. The computing environment 100 includes a group of machines $M_1, M_2, \ldots M_k$, interconnected by a network 110, such as a local area network (LAN). The machines $M_1, M_2, \ldots M_k$ may be computers, workstations, or other types of processors, as well as various combinations thereof. The present invention will be illustrated below in conjunction with an exemplary distributed computing system. It should be understood, however, that the invention is not limited to use with any particular type of distributed system, but is instead more generally applicable to any distributed computing environment or application. The disclosed techniques can be utilized with computers or other processors arranged in local area networks, wide area networks, metropolitan area networks, intranets, extranets and global networks, such as the Internet.

Figure 2:
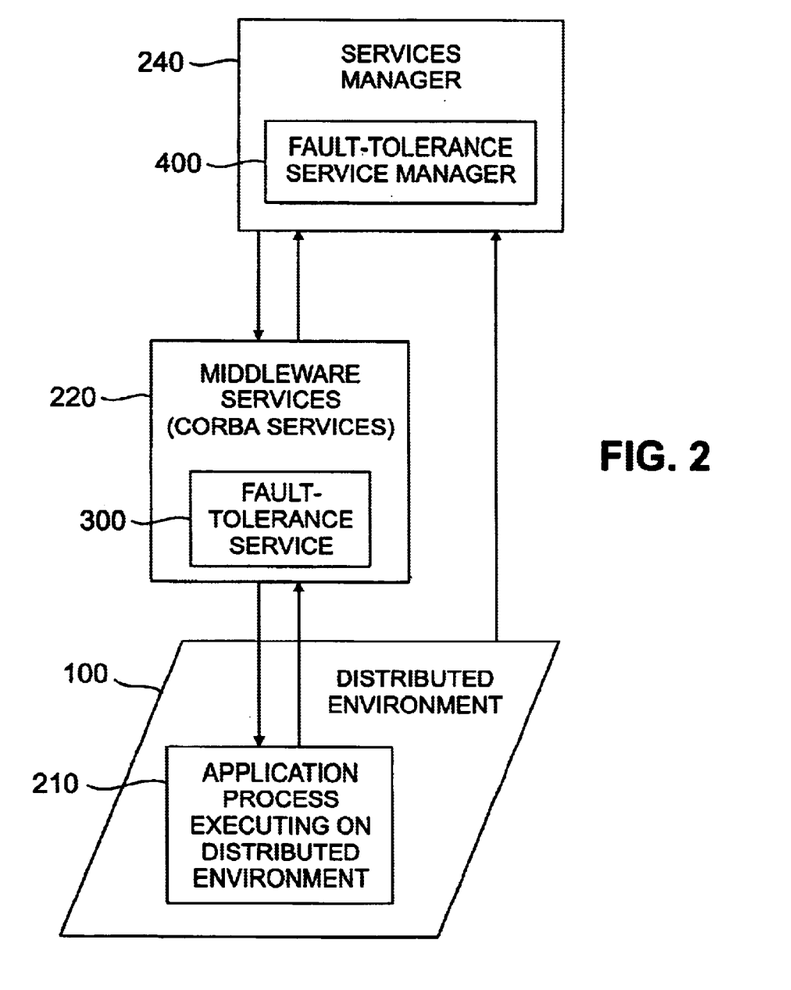
FIG. 2 illustrates an application process executing on the distributed computing environment of FIG. 1 and utilizing functionality provided by one or more middleware services that are managed by a service manager in accordance with the present invention.

FIG. 2 shows an application process 210 executing on the distributed computing environment 100 of FIG. 1. While the illustrative process 210 is a distributed object-oriented application developed using the CORBA middleware platform, the process 210 may alternatively be developed using the JAVA RMI or DCOM middleware platforms. For a general discussion of JAVA RMI or DCOM middleware platforms, see, A. Wollrath et al., "A Distributed Object Model for the Java System," USENIX Journal (Fall 1996), or D. Rogerson, Inside COM, Microsoft Press (Wash. 1997), respectively, each incorporated by reference herein.

CORBA is an architectural standard proposed by a consortium of industries called the Object Management Group (ONMG) and its operational model is based on remote procedure call (RPC)-style client-server communication. The core of the CORBA architecture is the Object Request Broker (ORB). The ORB acts as the object bus that locates the server for a client request and maintains the communication between the server and the client. The ORB provides server activation and server location transparency to the client. For a general discussion of CORBA standards, see, for example, OMG, The Common Object Request Broker: Architecture and Specification, Technical Report Revision 2.0, Object Management Group (1995), incorporated by reference herein.

The CORBA standard (and other middleware platforms) also propose additional middleware services 220, referred to as CORBA services in the CORBA standard, that are built and supported on top of the ORB. These services 220, such as the naming service, the trader service and the life cycle service, provide some useful functionality that can be used by all types of CORBA applications. For a general discussion of CORBA services, see, for example, OMG, CORBA Services: Common Object Services Specification, Technical Report, Object Management Group (March 1995). One particular middleware service 220 is the fault-tolerance service (FTS) 300, discussed further below in conjunction with FIG. 3. Generally, the fault-tolerance service 300 is implemented as a collection of interacting CORBA objects, that detect CORBA object failures and host failures, and recover CORBA objects from such failures.

According to a feature of the present invention, shown in FIG. 2, one or more service managers 240 are provided as a management interface to the corresponding middleware service 220. Generally, the service manager 240 monitors the corresponding middleware service 220, as well as the underlying distributed computer environment 100. Monitoring of the corresponding middleware service 220 permits the service manager 400 to understand the operation of the middleware service 220. In addition, monitoring of the underlying distributed computer environment 100 allows the middleware service 220 to operate more efficiently in response to run-time environmental conditions.

Figure 3:
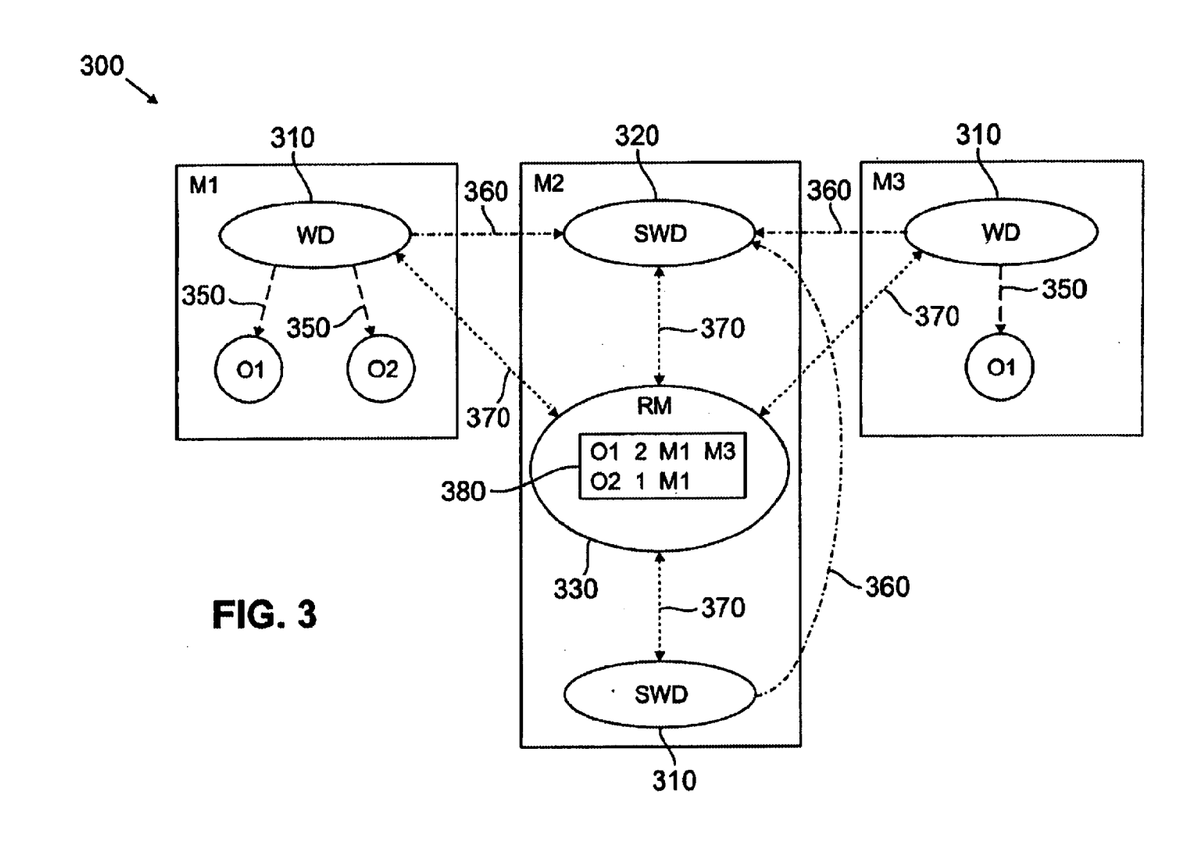
FIG. 3 illustrates the representative fault-tolerance service of FIG. 2.
Figure 4:
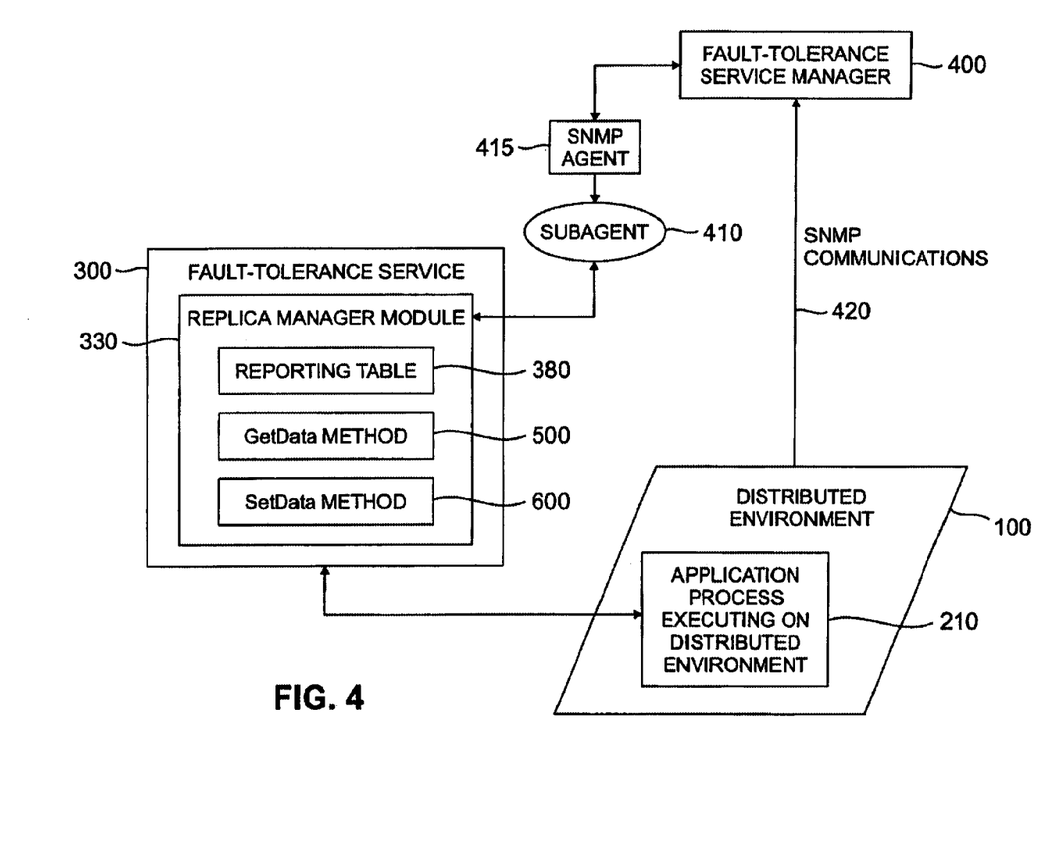
FIG. 4 illustrates the fault-tolerance service manager of FIG. 2, in accordance with the present invention.

In an illustrative implementation, a fault-tolerance service manager 400, discussed below in conjunction with FIG. 4, is provided as a management interface to the fault-tolerance service 300. Generally, the fault-tolerance service manager 400 monitors the fault-tolerance service 300, as well as the underlying distributed computer environment 100. Monitoring of the fault-tolerance service 300 permits the fault-tolerance service manager 400 to understand the operation of the fault-tolerance service 300. In addition, monitoring of the underlying distributed computer environment 100 by the fault-tolerance service manager 400 allows the fault-tolerance service 300 to tolerate failures using a failure-prevention approach, whereby the fault-tolerance service manager 400 notifies the fault-tolerance service 300 to migrate CORBA objects if the fault-tolerance service manager 400 detects that an object's local host may crash soon. In one embodiment, discussed below, the likelihood of a host failure is determined based on a health rating of the respective host.

Although the present invention is illustrated in the context of a fault-tolerance service manager 400 overseeing the fault-tolerance service 300, the proposed management interface 240 applies to other middleware services 220, as would be apparent to a person of ordinary skill in the art, based on the disclosure herein. Generally, adding separate management utilities to middleware services 220 is a natural, flexible and potent approach to improve the operation of the service. Thus, as shown in FIG. 2, the present invention results in a three-step architecture: the base application process 210, a middleware service 220, and the service manager 240.

As used herein, the term "process" is intended to include any type of program, instruction, code or the like which runs on one or more computers or other types of processors in a distributed system. The term "distributed system" is intended to include any system that includes two or more computers, machines ol processors. The term "checkpoint" as used herein is intended to include any set of information characterizing the state of an execution of a process at a given point in time. The term "host machine" refers generally to a computer, workstation or other processing device that receives a process and directs its execution on one or more machines. The term "machine" as used herein refers generally to any computer, workstation or other processing device that executes a process migrated from a host machine. A machine therefore need not be geographically remote from the host machine.

Fault-tolerance Service

As previously indicated the fault-tolerance service 300, shown in FIG. 3, provides a means for an application developer to enhance the availability and reliability of the application 210 built on top of CORBA. Generally, the fault-tolerance service 300 adds embedded fault-tolerance support to CORBA objects in order to tolerate host crashes, object crashes and object hangs. As discussed hereinafter, the fault-tolerance service 300 uses replication of objects as the mechanism to support high availability. The fault-tolerance service 300 provides failure detection, failure recovery, and replica management at the object level. The fault-tolerance service 300 preferably allows the application developer to choose the degree of reliability and availability by selecting from an array of choices for replication strategies, degree of replication, detection mechanisms, and recovery strategies that are best suited to the application object at hand. The fault-tolerance service 300 provides methods through which application objects can register their reliability requirements and then the fault-tolerance service 300 takes actions based on the options specified during registration. While the registration process for a conventional fault-tolerance service 300, typically relies on static (usually hard-coded) information, the present invention allows the registration and replication of application objects to be performed based on run-time environmental conditions.

As shown in FIG. 3, a fault-tolerance service 300 generally consists of three main modules, working together to provide the functionality described above. A replica manager module 330 is centralized and is responsible for the management of object replicas. An object can register with the replica manager module 330 with a requested degree of replication (number of replicas), a given replication style (hot, warm or cold backup), and a list of possible locations for the replicas. In accordance with a feature of the present invention, the fault-tolerance service manager 400 can suggest improvements for the degree of replication, replication style, or possible locations initially requested by the registering object, based on environmental conditions, such as underlying network resources and communications infrastructure.

The replica manager module 330 manages the initial placement and activation of these object replicas and also controls the migration of the replicas during object failures. Generally, once the replica manager module 330 receives an object registration, the replica manager module 330 will construct an object group for the object by instantiating replicas of the object on different hosts. The replica manager module 330 then elects a leader (primary copy) for the group, maintains the configuration of the group, changes the status of group members when required, and activates new replicas for the group during a fail-over to make the group size constant.

A watchdog module 310 runs on each host in the computing environment 100 and provides methods for accepting registrations from the replica manager module 330 or other application objects. Once an application object has registered, the watchdog module 310 periodically monitors the application object to detect failures. The watchdog module 310 detects object crashes and hangs for object servers running on the local host. The watchdog module 310 can use polling 350 to detect object crashes and heartbeats to detect object hangs, in a known manner. When the watchdog module 310 detects an object crash or hang, the watchdog module 310 reports the failure to the replica manager module 330 so that possible fail-over actions can be implemented. The watchdog module 310 also performs local recovery actions.

A super watchdog module 320 is centralized and is responsible for detection of host crashes and hangs. The super watchdog module 320 receives heartbeats 360 at regular intervals from each of the watchdog modules 310 in a network domain. Host crashes are detected by the super watchdog module 320 if heartbeats 360 from a previously registered watchdog module 31(0 do not arrive in a given time interval.

The replica manager module 330 receives reporting and registration information 370 from the various watchdog modules 310 to keep track of how many replicas of an object exist in a network domain, on which hosts they are running, the status of each replica, and the number of failures seen by the replica on a given host. Thus, the replica manager module 330 maintains all the process state information of the fault-tolerance service 300. A table 380 stored in the replica manager module 330 has the information about all the objects and their replicas in the system, their registration options, their location, their status, and the number of times they have failed on a particular host. As discussed below, the information in the replica manager table 380 will be monitored by the fault-tolerance service manager 400, in accordance with the present invention. To prevent loss of this state due to failure of the replica manager module 330, the replica manager table 380 is periodically checkpointed (not shown in FIG. 3).

FIG. 3 illustrates how the modules are used to control two application objects, O1 and O2. Object O1 on host $M_1$ registers with the replica manager module 330 with replication degree two and with possible hosts $M_1$ and $M_3$. The replica manager module 330 registers O1 with the watchdog modules 310 on $M_1$ and $M_3$. The watchdog module 310 on $M_3$ detects that there is no running copy of O1 on the local host and starts a copy on $M_3$. After activation, the watchdog module 310 watches over the replica through polling. Similarly, a single replica of the object O2 is run on $M_1$ and all the replicas are watched over by their local watchdog module 310 through polling. As shown in FIG. 3, the watchdog module 310 on each host sends heartbeats to the central super watchdog module 320.

Fault-tolerance Service Manager

As previously indicated, the fault-tolerance service manager 400, shown in FIG. 4, provides a management interface to the fault-tolerance service 300. In one preferred embodiment, the fault-tolerance service manager 400 does not change or perform any of the functions of the fault-tolerance service 300, nor does the fault-tolerance service manager 400 assume final responsibility about decisions related to the fault-tolerance mechanisms. In this manner, the fault-tolerance service 300 performs its own intended functions even in the absence of the fault-tolerance service manager 400. In other words, the fault-tolerance service 300 is able to function properly even if no fault-tolerance service manager 400 is available, although the efficiency of the fault-tolerance service 300 in improving the reliability of distributed objects may be reduced. In addition, since the fault-tolerance service manager 400 has minimal interference with existing fault-tolerance service 300 implementations, the fault-tolerance service manager 400 may consist of existing management technology.

As shown in FIG. 2, the illustrative fault-tolerance service manager 400 interacts with the illustrative fault-tolerance service 300 bi-directionally. First, the fault-tolerance service manager 400 obtains data about the operation of the fault-tolerance service 300, such as the names, number and type of registered objects, and the location and status of the watchdog modules 310 and the super watchdog module 320. The obtained data can be used to analyze the fault-tolerance service 300, as well as to display the status of the fault-tolerance service 300 in a graphical interface. Secondly, the fault-tolerance service manager 400 collects additional information about the underlying computing platform, in a manner described below, processes the data and feeds the resulting information back to the fault-tolerance service 300. The data collected can, for instance, include the status of the operating system resources, the instantaneous load, failure rate or performance of one or more machines, or the status of the communication links in the computing environment 100. The collected data can be used to determine a health rating of components within the computing environment 100 which can be utilized, for example, to select an optimal machine for migration, or to trigger migration or additional replication in the event the health rating indicates that a failure is expected.

Figure 5:
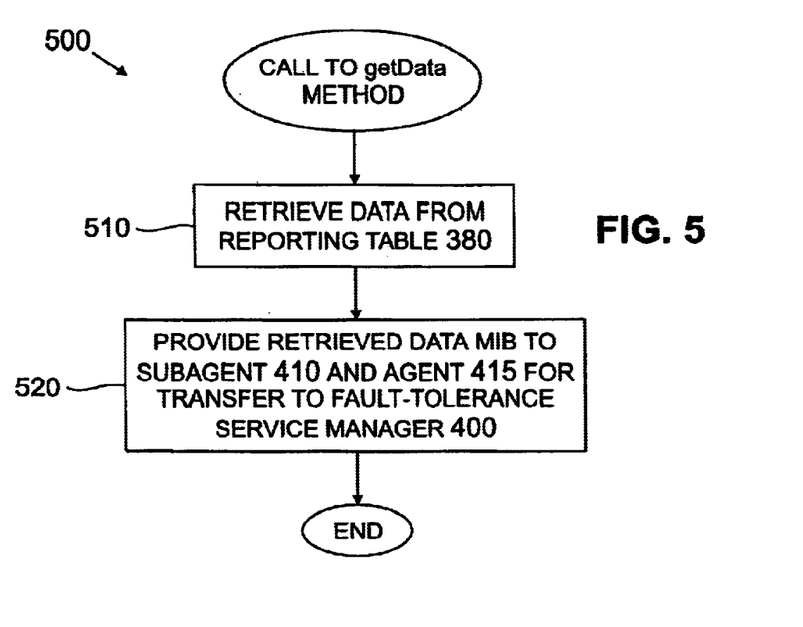
FIG. 5 is a flow chart describing a getData process implemented by the replica manager module of FIG. 4.

As previously indicated, the fault-tolerance service manager 400 preferably interfaces with the fault-tolerance service 300 through the replica manager module 330, since the replica manager module 330 contains a table 380 with all of the data that the fault-tolerance .service manager 400 might want to collect about the fault-tolerance service 300. In addition, in this way the changes required to the fault-tolerance service 300 are limited to the replica manager module 330. In order to establish the information exchange from the replica manager module 330 to the fault-tolerance service manager 400, a single getData method 500, discussed below in conjunction with FIG. 5, is added to the replica manager module 330 IDL, which, when called, delivers all information in the replica manager module 330 to the fault-tolerance service manager 400.

Figure 6:
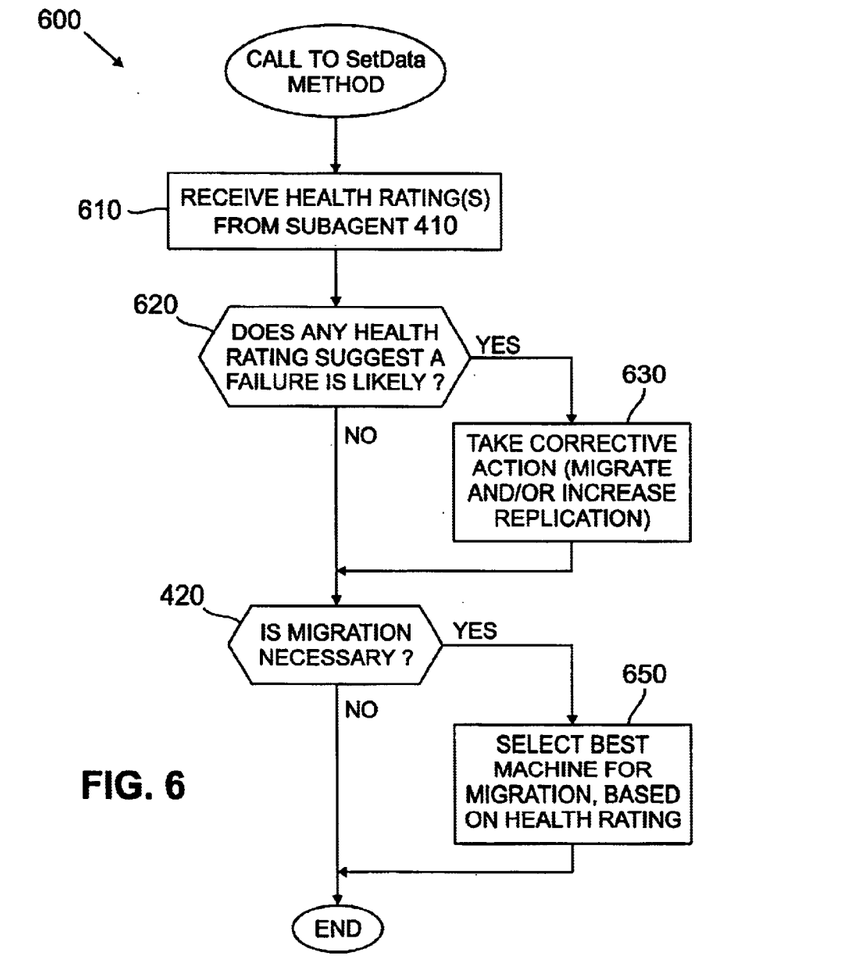
FIG. 6 is a flow chart describing a setData process implemented by the replica manager module of FIG. 4.

Likewise, the fault-tolerance service manager 400 may want to pass information back to the fault-tolerance service 300. Again, information is preferably passed only to the replica manager module 330. In addition, in order for the replica manager module 330 to receive and process information from the fault-tolerance service manager 400, a single setData method 600, discussed below in conjunction with FIG. 6, is added to the replica manager module 330 IDL, which, when called, processes information received from the fault-tolerance service manager 400. While a conventional replica manager module 330 has a view which only includes the components that are involved in the fault-tolerance service 300, the fault-tolerance service manager 400 has a much more detailed view about underlying resources and the communication infrastructure. The management information sent from the manager to the fault-tolerance service 300 should use an abstraction level that matches the decision algorithm used by the replica manager module 330. In one embodiment, discussed below in conjunction with FIG. 6, the fault-tolerance service manager 400 abstracts a health rating from the collected system data that evaluates the status of system resources, and passes the health rating(s) to the replica manager module 330 for processing.

Service Manager Interfaces

FIG. 4 illustrates a preferred implementation of the interfaces 410, 415 and 420 used by the fault-tolerance service manager 400 to communicate with the fault-tolerance service 300 and the underlying computing environment 100, respectively. As previously indicated, the fault-tolerance service manager 400 may utilize existing management technologies, since the fault-tolerance service manager 400 has minimal interference with the fault-tolerance service 300 implementations. One preferred implementation utilizes the Simple Network Management Protocol (SNMP). Therefore, existing agent implementations may be utilized, such as the sub-agent development kit available for Solaris™ machines, as well as the Scotty Tnm Tcl extension, described in J. Schonwalder and H. Langendorfer, "Tcl Extensions For Network Management Applications," Proc. 3rd Tcl/Tk Workshop, 279–88, Toronto, Canada (July 1995).

As shown in FIG. 4, a subagent 410 is utilized to communicate with the SNMP agent 415 and thereby translate between the SNMP environment of the fault-tolerance service manager 400 and the CORBA world of the illustrative fault-tolerance service 300. The fault-tolerance service manager 400 preferably interfaces with the fault-tolerance service 300 only through the replica manager module 330. The subagent 410 runs on the same host as the replica manager module 330. The SNMP agent 415 may be embodied as the SNMP agent provided by Sun Microsystems Inc.

for Solaris™ systems or other operating system-specific agents. The subagent 410 may be implemented in C using the Solaris™ subagent development kit. The subagent 410 operates as a CORBA client, and uses a sub-agent protocol, such as AgentX, to present the management information as part of the SNMP management information base exported by the local system. For a discussion of the AgentX sub-agent protocol, see, for example, M. Daniele et al., "Agent Extensibility (AgentX), Protocol Version 1," RFC 2257, Digital Equipment Corporation, IBM, Cisco Systems (January 1998).

Since the subagent 410 is a CORBA client, the subagent 410 is compiled with the CORBA client library and the stub of the replica manager module 330. The subagent is therefore able to obtain a reference to the replica manager module 330. The subagent 410 provides transparent access to a management information base (MIB) implementation of the fault-tolerance service 300. The MIB of the fault-tolerance service 300 generally contains a specification of all the information the replica manager module 330 has about the functioning of the fault-tolerance service 300.

In one embodiment, a fault-tolerance service 300 management information base (MIB) is used to specify the information that the fault-tolerance service manager 400 can request from the fault-tolerance service 300. As previously indicated, the MIB of the fault-tolerance service contains a specification of all the information the replica manager module 330 has about the functioning of the fault-tolerance service 300. In one embodiment, the MIB defines three tables. The first table lists the client objects that make use of FTS services, and some of its parameters, like name, replication style, number of replications. The second table lists the objects and replicas under control of the replica manager module 330 for each client, and contains entries for the host name and object status. The third table lists all the components that make up the fault-tolerance service 300, together with their location, including an indication of whether a component is a watchdog module 310, a super watchdog module 320 or a replica manager module 330. The third table is useful for the fault-tolerance service manager 400 to discover the structure of the fault-tolerance service 300, so that it can adjust the monitoring activities to the most critical components.

As previously indicated,:the IDL of the replica manager 330 contains a getData method 500, shown in FIG. 5, that extracts information from the replica manager module 330 about registered client objects and existing replicas. As shown in FIG. 5, when called, the getData method 500 will initially retrieve the data from the reporting table 380 of the replica manager module 330 during step 510, before providing the retrieved data (in accordance with the MIB in the illustrative implementation) to the subagent 410 and agent 415 during step 520, for transfer to the fault-tolerance service manager 400. Thereafter, program control terminates.

As previously indicated, the IDL of the replica manager 330 contains a setData method 600, shown in FIG. 6, that allows the subagent 410 to provide information to the fault-tolerance service 300. The replica manager module 330 uses the setData method 600 to receive and process this information, such as the health rating(s), to enhance its decision-making. As shown in FIG. 6, the setData method 600 initially receives the health rating(s) of the various system components from the subagent 410 during step 610. Thereafter, the setData method 600 performs a test during step 620 to determine if any received health rating indicates a failure is likely. If it is determined during step 620 that a failure is likely, then corrective action is taken during step 630. For example, the setData method might migrate a process that is executing at a host that is likely to fail to an alternate machine, or might increase the replication of affected processes.

Thereafter, a further test is performed during step 640 to determine if any migration is necessary. If it is determined during step 640 that migration is necessary, the best machine for migration is selected for migration during step 650, based on the health rating(s). If, however, it is determined during step 640 that migration is not necessary, then program control terminates.

It is to be understood that the embodiments and variations shown and described herein are merely illustrative of the principles of this invention and that various modifications may be implemented by those skilled in the art without departing from the scope and spirit of the invention.

We claim:

1. A fault-tolerance method for an application process executing in a distributed computing environment, said fault-tolerance method comprising the steps of:
   monitoring said application process with a fault-tolerance service;
   obtaining environmental information about the distributed computing environment; and
   dynamically adjusting the operation of said fault-tolerance service in response to said environmental information.

2. The method according to claim 1, further comprising the step of obtaining reporting information about the operation of fault-tolerance service.

3. The method according to claim 2, wherein said reporting information includes information about application objects registered with said fault-tolerance service and information about the location and status of fault-tolerance service entities.

4. The method according to claim 1, wherein said environmental information includes information about the status of operating system resources.

5. The method according to claim 1, wherein said environmental information includes information about the instantaneous load, failure rate or performance of one or more machines in said distributed computing environment.

6. The method according to claim 1, wherein said environmental information includes information about the status of the communication links in said distributed computing environment.

7. The method according to claim 1, further comprising the step of using said environmental information to determine a health rating of components within said distributed computing environment.

8. The method according to claim 7, wherein said health rating can be utilized to select an optimal machine for migration.

9. The method according to claim 7, wherein said health rating can be utilized to trigger migration or additional replication in the event the health rating indicates that a failure is expected.

10. The method according to claim 1, wherein said fault-tolerance method does not impact the operation of said fault-tolerance service.

11. The method according to claim 1, wherein said environmental information is obtained using one or more data collection agents.

12. The method according to claim 2, wherein said reporting information is obtained using one or more data collection subagents.

13. A method of supporting an application process executing in a distributed computing environment, said method comprising the steps of:

accessing one or more middleware services containing functionality that may be accessed by said application process;

managing said middleware service, said managing step collecting environmental information about the distributed computing environment; and dynamically adjusting the operation of said middleware service in response to said environmental information.

14. The method according to claim 13, further comprising the step of obtaining reporting information about the operation of the middleware service.

15. The method according to claim 13, wherein said environmental information includes information about the status of operating system resources.

16. The method according to claim 13, wherein said environmental information includes information about the instantaneous load, failure rate or performance of one or more machines in said distributed computing environment.

17. The method according to claim 13, wherein said environmental information includes information about the status of the communication links in said distributed computing environment.

18. The method according to claim 13, wherein said method does not impact the operation of said middleware service.

19. The method according to claim 13, wherein said environmental information is obtained using one or more data collection agents.

20. The method according to claim 14, wherein said reporting information is obtained using one or more data collection subagents.

21. A system for minimizing faults in an application process executing in a distributed computing environment, said system comprising:

a fault-tolerance service for monitoring said application process; and a fault-tolerance service manager for obtaining environmental information about the distributed computing environment for dynamically adjusting the operation of said fault-tolerance service in response to said environmental information.

22. A system for minimizing faults in an application process executing in a distributed computing environment, said system comprising:

means for monitoring said application process with a fault-tolerance service;

means for obtaining environmental information about the distributed computing environment; and means for dynamically adjusting the operation of said fault-tolerance service in response to said environmental information.

23. A system of supporting an application process executing in a distributed computing environment, said system comprising:

one or more middleware services containing functionality that may be accessed by said application process; and a management interface for said middleware service, said management interface collecting environmental information about the distributed computing environment and dynamically adjusting the operation of said middleware service in response to said environmental information.

24. A system of supporting an application process executing in a distributed computing environment, said system comprising:

means for accessing one or more middleware services containing functionality that may be accessed by said application process;

means for managing for said middleware service, said managing means collecting environmental information about the distributed computing environment; and means for dynamically adjusting the operation of said middleware service in response to said environmental information.

25. A multi-processor distributed environment for executing an application process in computer readable form, said multi-processor distributed environment further comprising a management software module in computer readable form for managing a middleware service, said middleware service containing functionality that may be accessed by said application process and said management software module collecting environmental information about the multi-processor distributed environment and dynamically adjusting the operation of said middleware service in response to said environmental information.

* * * * *

UNITED STATES PATENT AND TRADEMARK OFFICE
CERTIFICATE OF CORRECTION

PATENT NO. : 6,789,114 B1
DATED : September 7, 2004
INVENTOR(S) : Garg et al.

It is certified that error appears in the above-identified patent and that said Letters Patent is hereby corrected as shown below:

Title page,
Item [54], Title, replace "METHODS AND APPARATUS FOR MANAGING MIDDLEWARE SERVICE IN A DISTRIBUTED SYSTEM" with -- METHODS AND APPARATUS FOR MANAGING MIDDLEWARE SERVICES IN A DISTRIBUTED SYSTEM --.

Column 1,
Line 2, before "IN" and after "MIDDLEWARE" replace "SERVICE" with -- SERVICES --.

Column 9,
Line 44, before "IDL" and after "previously," replace "indicated,:the" with -- indicated, the --.

Signed and Sealed this

Twentieth Day of September, 2005

JON W. DUDAS
*Director of the United States Patent and Trademark Office*